UNITED STATES PATENT OFFICE.

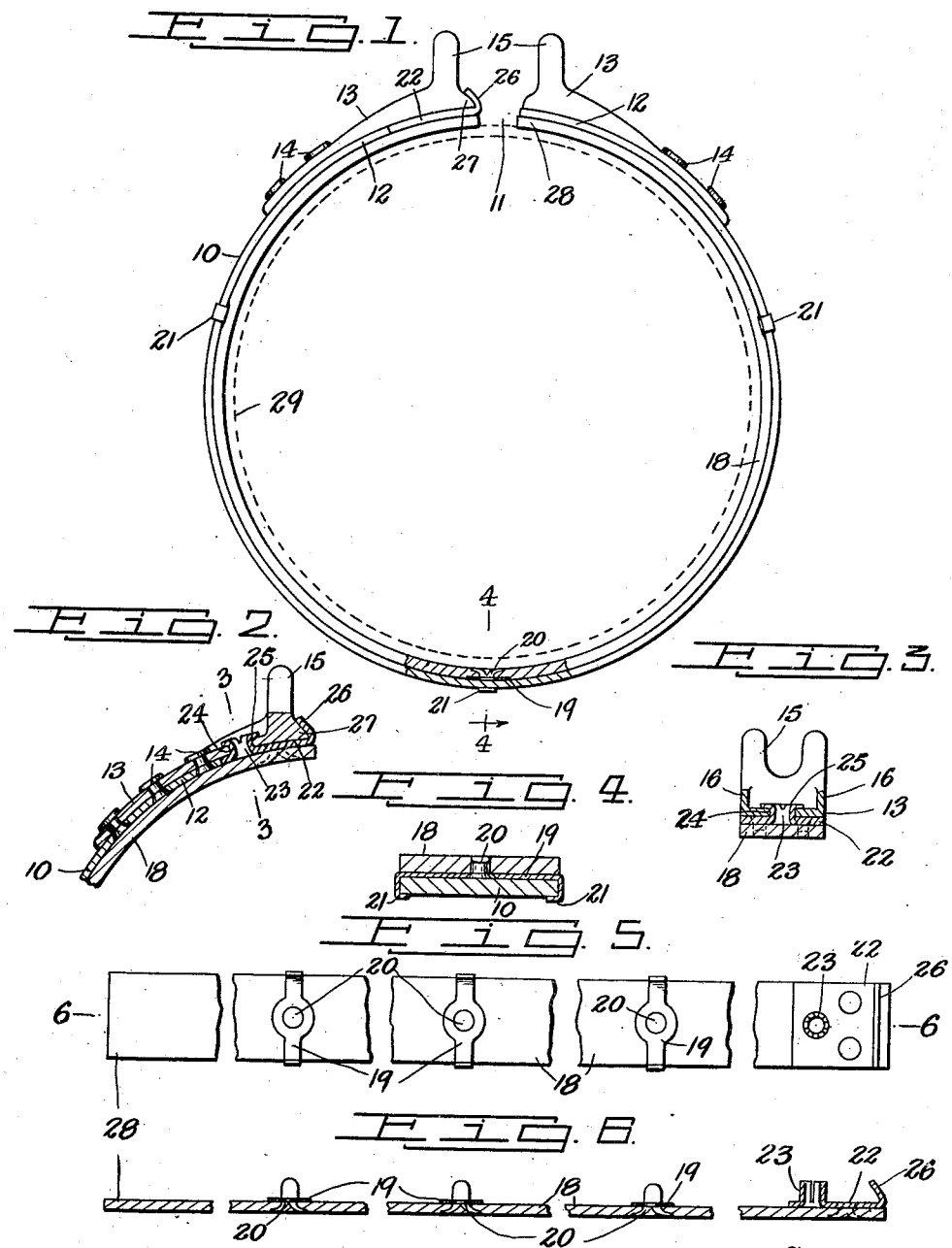

ARTHUR L. RENNIE, OF JAMAICA, NEW YORK.

BRAKE-BAND LINING.

1,424,852.  Specification of Letters Patent.  Patented Aug. 8, 1922.

Application filed June 4, 1921. Serial No. 474,936.

*To all whom it may concern:*

Be it known that I, ARTHUR L. RENNIE, a citizen of the United States, and residing at Jamaica, L. I., in the county of Queens and State of New York, have invented certain new and useful Improvements in Brake-Band Linings, of which the following is a specification, such as will enable those skilled in the art to which it appertains to make and use the same.

This invention relates to brake band linings and particularly to devices of this class adapted for use in planetary transmission constructions, and the object of the invention is to provide a device of the class specified which is so constructed as to facilitate its connection with and detachment from brake bands in constructions of the class specified, whereby considerable time and labor are saved in the use thereof as compared with similar devices as heretofore constructed; and with this and other objects in view the invention consists in a device of the class and for the purpose specified, constructed as hereinafter described and claimed.

The invention described and claimed herein is an improvement on that described and claimed in a prior application for Letters Patent of the United States filed by me Apr. 28, 1921, Ser. No. 465,317, and said invention is fully disclosed in the following specification, of which the accompanying drawing forms a part, in which the separate parts of my improvement are designated by suitable reference characters in each of the views.

Referring to the drawing:—

Fig. 1 is a side view showing a brake band with a lining, or lining strip, mounted in connection therewith according to my invention, part of the construction being in section;

Fig. 2 a section through one end portion of the device as shown in Fig. 1, and at right angles to the axis of the band;

Fig. 3 a section on the line 3—3 of Fig. 2;

Fig. 4 a section on the line 4—4 of Fig. 1;

Fig. 5 an outside view of the lining strip which I employ; and,

Fig. 6 a section on the line 6—6 of Fig. 5.

In Fig. 1 of the drawing I have shown at 10 a brake band, such as is commonly employed in planetary transmission gears or devices in a motor vehicle, and this band is open at one side as shown at 11, and the free end portions 12 thereof are provided with bracket plates 13 which are riveted to the band as shown at 14, and said bracket plates are provided with upstanding yoke-shaped members 15, and side flanges 16, and the transverse dimensions of the band 10 and bracket plates 13 are the same, or approximately so.

I also provide a brake band lining strip 18 which is composed, as usual, of fibrous material and secured transversely of the outer face of said facing strip at predetermined points are keepers 19, three of which is shown, said keepers being composed of flexible sheet material, comprising narrow strips provided with enlarged central portions through which are passed rivets 20 countersunk in the inner facing of the lining strip, and the end portions of said keepers are bent to form projecting hook members 21 adapted to engage the opposite side edges of the brake band 10 to hold the lining strip against lateral movement on said band.

The brake band 10 is shorter at one end than at the other in the construction shown, or does not come to the end of the corresponding bracket plate 13, and the corresponding end of the lining strip 18 is provided on its outer face with an attaching or engaging plate 22 which is riveted or otherwise secured to said strip, and said plate is provided at its outer end with an outwardly and backwardly directed hook member 26, which is adapted to cooperate with a projecting lip 27 at the outer end of one of the bracket plates 13, as clearly shown in Figs. 1 and 2, and said plate 22 is also provided with a tubular rivet 23 adapted to be passed through a corresponding aperture 24 in the bracket plate 13, as clearly shown in Figs. 2 and 3.

In attaching the lining strip 18 to the brake band, the end portion 28 of said lining strip is first passed between the band 10 and a brake drum, or the like indicated in dotted lines at 29 in Fig. 1, and said lining strip is fed around between the band 10 and the drum 29 and the keepers 19, in this operation, are placed in position to engage the band 10 as shown in Figs. 1 and 4 of the drawing to guide the lining strip in its movement and to hold said lining strip in proper position on the drum 29 and on the inner face of the band 10, and after said lining strip has been moved into the position shown in Fig. 1, or approximately so, the hook member 26 on the end of the plate 22 is engaged with the lip 27 on the end of the corresponding bracket plate 13, after which the body of the plate 22 is forced downwardly onto said bracket plate and, in this operation, the tubular rivet 23 passes through the aperture 24 in said bracket plate and is riveted or headed as shown in Figs. 2 and 3 at 25, and this securely locks the plate 22 which is secured to the lining strip 18 to the bracket plate 13, and the lining strip is held in proper position when the apparatus of which it forms a part is in operation.

With my improvement it will be seen that a new lining strip may be substituted for an old one at any time by breaking the connection of the rivet 23 with the bracket plate 13 and providing a new lining strip provided with the plate 22. While I have shown and described details of construction which I prefer to employ, it must be understood that my invention is not limited to said details of construction and especially to the length of the brake band 10, as herein shown and described, or the form of the bracket attachment of which the plate 13 forms a part, or to the position of the attaching plate 22 on the lining strip 18, and various changes in and modifications of the details of construction herein shown and described may be made, within the scope of the appended claims, without departing from the spirit of my invention or sacrificing its advantages.

Having fully described my invention, what I claim as new and desire to secure by Letters Patent, is:—

1. A lining strip for brake bands provided on its outer face with transverse keepers, having hook-shaped end members adapted to engage the side edges of the brake band and also with an attaching plate having an outwardly directed rivet member.

2. A brake band provided at its opposite ends with bracket plates which are secured thereto and a lining strip for said band, said lining strip being provided with transverse keepers adapted to engage the opposite side edges of the brake band and with an attaching plate having an outwardly directed rivet member adapted to be passed through a corresponding aperture in one of the bracket plates.

3. A brake band provided at its opposite ends with bracket plates which are secured thereto and a lining strip for said band, said lining strip being provided with transverse keepers adapted to engage the opposite side edges of the brake band and with an attaching plate having an outwardly directed rivet member adapted to be passed through a corresponding aperture in one of the bracket plates, said attaching plate being also provided at its outer end with a hook member adapted to engage a lip on the corresponding end of said bracket plate.

4. A brake band lining strip having an attaching plate provided with an outwardly directed rivet member whereby it may be secured to the brake band.

5. A brake band lining strip having an attaching plate provided with an outwardly directed rivet member whereby it may be secured to the brake band, said attaching plate being also provided with a hook member adapted to engage a corresponding part on the brake band.

6. A brake band lining strip having means on opposite points thereon for engaging the side edges of the brake band, and an attaching plate provided with an outwardly directed rivet member whereby it may be secured to said brake band.

In testimony that I claim the foregoing as my invention I have signed my name in presence of the subscribing witnesses this 3rd day of June, 1921.

ARTHUR L. RENNIE.

Witnesses:
C. E. MULREANY,
H. E. THOMPSON.